March 18, 1969 NOBORU HAGIHARA 3,433,250

POP SAFETY VALVE

Filed Dec. 12, 1967 Sheet _1_ of 2

INVENTOR.
NOBORU HAGIHARA
BY Wenderoth, Lind & Ponack
Attorney

United States Patent Office 3,433,250
Patented Mar. 18, 1969

3,433,250
POP SAFETY VALVE
Noboru Hagihara, Nishinomiya, Japan, assignor to Toa Valve Co. Ltd., Amagasaki, Japan
Filed Dec. 12, 1967, Ser. No. 689,846
Claims priority, application Japan, Dec. 27, 1966, 42/278
U.S. Cl. 137—469
Int. Cl. F16k 17/30, 25/00
5 Claims

ABSTRACT OF THE DISCLOSURE

A pop safety valve comprises a valve disk and a valve seat. The bottom surface of the disk is provided with an annular protrusion slightly inward from the peripheral edge and an inwardly extending annular flange along the peripheral edge of the bottom. The upper surface of the flange is kept in contact with the end surface of the protrusion, with an annular space formed between the flange and the protrusion. The under surface of the flange serves as a contacting surface for contact with the valve seat.

---

The present invention relates to safety valves, more particularly to spring-loaded pop safety valves which are in common use in steam boilers or the like for relieving excess pressure.

In general, a safety valve, unlike other stop valves, is closed when the carefully finished surfaces of both valve disk and valve seat are brought into contact with each other. The disk is pressed against the seat solely by the difference in the loading force between the pressure exerted by the spring and the pressure of the inner fluid. Therefore, it has technically been extremely difficult to obtain such a perfect contact between the disk and seat that leakage is still prevented even when the disk is about to pop up due to the increasing inner pressure, namely, when only a very low pressure is available for effecting closure. The condition becomes far more serious as the inner pressure further increases. Should the slightest leakage be initiated between contacting surfaces of the disk and seat, the rapid outflow of steam erodes the contacting surfaces at the leaking portion and thereby develops a permanent leakage. At the same time, the sudden expansion of the fluid flowing out of the leaking portion produces a marked temperature drop in the neighborhood of the portion further causing local contraction of the disk or the seat, whereby the leak orifice becomes inevitably larger in size giving rise to a pronounced leakage rapidly.

In order to overcome such disadvantages a safety valve has already been proposed, in which, as a principal feature, the bottom surface of a valve disk is provided with an annular flange formed as thin as possible and having a surface for contact with a valve seat so that a satisfactory thermal transference may be insured while the local cooling effect attributable to leaking steam may be prevented from exerting objectionable influence. However, according to such a conventional safety valve having this type of structure, the flange portion and the contacting surface at the thin annular edge portion thereof cannot be provided with strength sufficient to withstand a large shock impact which is created when the valve is closed or when the spring pressure is applied thereon upon a marked reduction of the internal pressure. Accordingly, incidents such as damage and deformation in the contacting surfaces of the valve disk and seat are frequently observed to take place.

The valves for use with steam or imperfect gases of high temperature and pressure built in accordance with the present invention can produce remarkable effects.

A principal object of the present invention is to provide a safety valve capable of leak-proof, reliable closure, in which the valve disk, serving as a rigid body, can withstand a severe shock or depressing load exerted by the spring, while against the upward pressure the disk can exhibit such suitable flexibility that, even when the pressure is on the point of reaching the popping point, the disk still keeps a slight contact with the seat as in a line contact, permitting the low spring pressure to work effectively.

Another important object of the present invention is to provide a safety valve in which erosion in the contacting surfaces is prevented by providing the valve with relatively wide contacting surfaces which serve to reduce the velocity of the outflowing leakage of the fluid.

Still another object of the present invention is to provide a safety valve which is protected against the extension of the leakage due to the temperature drop caused by the initial leakage.

Other objects and advantages of the present invention will become apparent from the following detailed description with reference to the accompanying drawings, in which.

Figure 1:
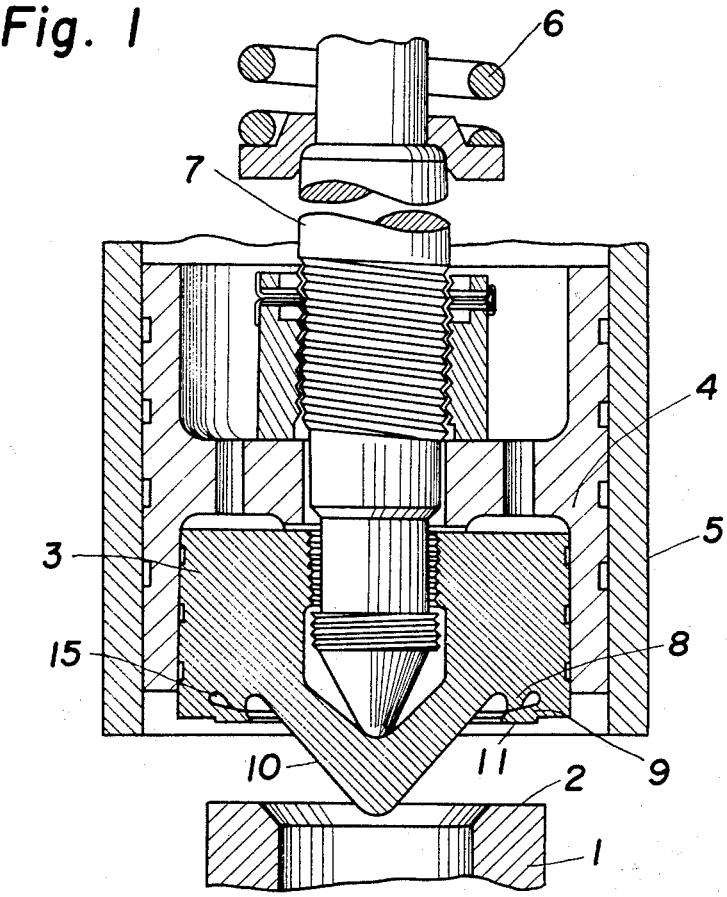
FIG. 1 is a view mainly in cross section showing the principal elements of a safety valve in accordance with the present invention, illustrating the structural relationship between a valve disk and a valve seat as the valve is opened.
Figure 2:
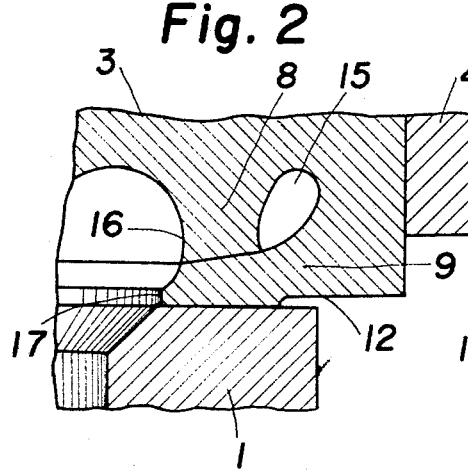
FIG. 2 is a fragmentary enlarged view in cross section showing a flange of the valve disk and valve seat of the safety valve in FIG. 1, the valve being closed.
Figure 3:
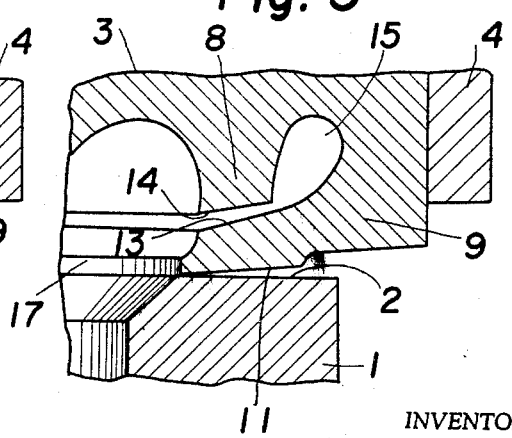
FIG. 3 is a fragmentary enlarged view in cross section showing the same as the inner pressure is on the point of reaching the popping point and a line-like contact is maintained between the inner peripheral edge of the flange and the seat surface.

Referring now to the drawings, there is shown in FIG. 1 the principal elements of the safety valve of the present invention, a valve disk and a valve seat. The numeral 1 designates the valve seat mounted in a casing (not shown in the figure), and an annular upper end surface thereof which is carefully finished serves as a seat surface 2. The numeral 3 indicates a valve disk assembled with a disk holder 4 as one body and formed in a cylindrical shape which is guided by a guiding member 5 so as to slidably move vertically against said seat surface 2. The bottom surface of the disk serves as a pressure receiving surface the fluid pressure is applied on, while the rear portion of said surface is provided with a spring 6 mounted on a valve stem 7 whereby the disk is always downwardly pressed against the seat surface 2. On the bottom surface of the disk, some distance inside but near to the outer peripheral surface thereof is formed an annular protrusion 8 concentrically and integrally with said disk as shown in FIGS. 2 and 3. The bottom portion of the disk along the peripheral edge is, also integrally therewith, provided with an annular flange 9 which is bent inwardly. The under surface of said flange 9 is formed horizontally, the inner portion along the inner peripheral edge thereof being finished carefully as a contacting surface 11 for contact with the seat surface 2, the outer portion thereof being recessed to provide a clearance as indicated by the numeral 12. The flange 9 tapers toward inward direction and the downwardly inclined upper surface 13 of said flange 9 is kept in uniform snug-fit contact with the inclined end surface 14 of said annular protrusion 8 whereby an annular space 15 is formed between the flange 9 and protrusion 8. Furthermore, the edge portion of the flange 9 inwardly extends slightly beyond the inner side wall surface 16 of said protrusion 8. This extending portion is formed into a sufficiently thin brim 17 which is so disposed as to permit the inner edge of the contacting surface 11 to have larger diameter than the inner edge of the seat surface 2. Through such formation of the structure, the center of the downward pressure by the spring 6 can always coincide with that of the fluid pressure exerted on the main surface 10. While being provided with a relatively large width, the entire area of the contacting surface 11 should be brought into contact with the seat surface 2, hence the diameter of the outer edge of said contacting surface 11 is not greater than that of the outer edge of said surface 2. Serving as a main pressure surface 10 for receiving the fluid pressure is a relatively wide bottom surface of the valve disk which is defined by the annular protrusion 8. Although the annular space 15 is normally enclosed due to the tight fitting of the flange 9 and the protrusion 8, the flowing fluid can actually enter the space 15 through the clearance between the contacting surfaces 13 and 14. On the other hand, because of the provision of the space 15, the flange 9 has a certain extent of flexibility at the base portion thereof which is relatively of a thin structure whereby the upper surface 13 of the flange can be elastically set apart from the end surface 14 of the protrusion 8.

Figure 4:
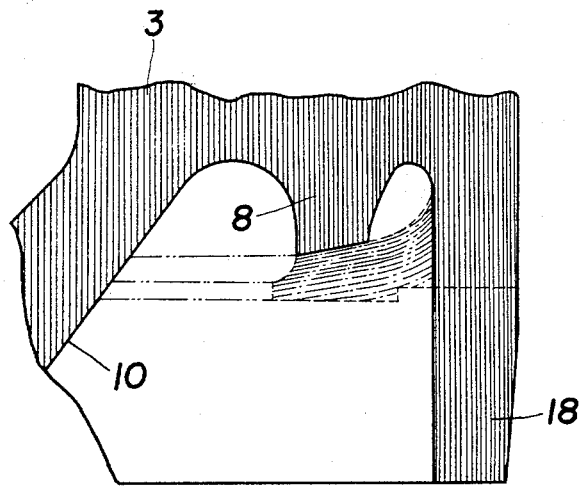
FIG. 4 is a fragmentary enlarged view in cross section showing metal fibers in the flange portion of the valve disk embodying the present invention.

FIG. 4 illustrates a structure of the valve disk, particularly of the flange portion thereof in accordance with the present invention. The annular flange 9 is formed of a peripheral wall of a cylinder-shaped disk material having metal fibers in vertical direction. A portion 18, an integral part of said wall to be formed into an annular flange is bent inwardly into tight contact with the end surface 14 of the protrusion 8 in hot forming while the original direction of the fibers is maintained, thereafter the contacting surface 11 for contact with the seat surface 2 and the other aforementioned portions being finished by mechanical means. Thus, integrally with the main body of the disk 3, the flange 9 is formed, still maintaining therein, and without breaking the metal fibers originally vertically directed within the cylinder-shaped valve disk. As compared with a similarly shaped disk which is formed by an ordinary method, the flange thus built has a remarkable advantage that the base portion thereof is provided with a pronounced strength, particularly with high resistance against impact, whereby the contacting surfaces are protected against possible damage or deformation. However, even when a flange is made by a common method and the metal fibers are cut off in the said portion, a disk having a flange which is built in accordance with the structure of the present invention exhibits much higher strength than of the conventional type.

Figure 5:
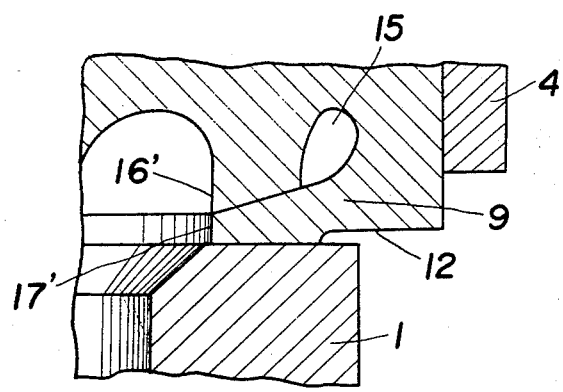
FIG. 5 is a fragmentary enlarged view in cross section showing a valve flange and valve seat in another embodiment of the present invention.

FIG. 5 fragmentarily shows a valve disk and seat of a safety valve in another embodiment of the present invention. This example is different from the foregoing embodiment in that the inner side wall 16' of the protrusion 8 is flush with the circular inner edge of the flange, namely, with a brim 17'. According to the example, the same outstanding results as described above can also be achieved.

Since the present invention is characterized by the structural features as stated above, it will readily be understood that the present invention has the following advantages. Though made of a relatively thin metal structure, the flange 9 in the safety valves in accordance with the present invention exhibits high strength equivalent to a rigid body when it is pushed down against the seat, since the upper surface 13 thereof is normally kept in tight contact with the aforementioned protrusion 8. In addition, with its relatively wide area of the contacting surface 11 for contact with the seat 1, the flange can withstand a large shock impact upon contacting or a high pressure exerted thereon by the spring 6. Thus the contacting surfaces of the valve disk and seat can satisfactorily be protected against damage and deformation.

Furthermore, when the valve disk is in the closed position, the inner fluid passing through the clearance between the contacting surfaces of said protrusion 8 and flange 9 fills the annular space 15, exerting pressure on the inner surface of said space 15 including the upper surface 13 of the flange. This pressure tends to push open the space, pressing the upper surface 13 downward, thereby effecting improved tight contact between the flange and the seat. In addition, just before the popping point is reached and the upward pressure balanced by the pressure of the spring, the valve disk is gradually lifted up by the increasing upward pressure exerted on the pressure receiving surface 10 and on the ceiling portion within the annular space 15. As a result, as shown in FIG. 3, at the base portion of the flange proximate to the ceiling portion of the space 15 a force to push open the space 15 is created, whereby the abutting surfaces of the flange and the protrusion tend to get separated, so that the flange now stands on its inner peripheral edge in a line-like contact with the seat surface, with the result that the pressure per unit area at said contacting portions is remarkably increased; the effective pressure by the spring at this stage, small as it is, can thus perform reliable closure.

Because of the structure previously described, the safety valve according to the present invention has other advantages. Thanks to the provision of the protrusion 8, the safety valve in accordance with the present invention can be provided with wide contacting surfaces, so that even if leakage should take place because of imperfect contact, the high velocity of the outflowing fluid is reduced thereby further preventing the erosion in the surfaces. Moreover, since there is the protrusion, the peripheral inner edge of the flange can be formed so thin that, when leakage occurs immediately before the popping point, the temperature in said edge portion including the contacting surface proximate to the leaking portion can be kept at the same level with that of the fluid, by which extension of the leakage attributable to the temperature drop is eliminated.

Although the present invention has been described above with respect to typical embodiments, I do not wish to limit the invention only to the embodiment, but the invention may also reside in all of the substitutes, equivalents and alterations without departing from the principle of the invention as set forth in the claims stated below.

What is claimed is:

1. A valve disk for a pop safety valve comprising an annular protrusion having an inclined end surface formed in the bottom surface of said disk a distance inward from the peripheral edge thereof, and an annular flange extending inwardly with taper from the bottom peripheral edge of said disk, the inner upper surface of said flange being in tight-fitting contact with the inclined end surface of said protrusion with an annular space formed therebetween, said flange being provided with an under surface serving as a seating surface for contact with a valve seat.

2. A valve disk for a pop safety valve as claimed in claim 1, wherein an annular brim of said flange extends inward beyond said protrusion.

3. A valve disk for a pop safety valve as claimed in claim 1, wherein an annular brim of said flange is flush with the inner side wall of said protrusion.

4. A valve disk for a pop safety valve as claimed in claim 1, wherein said flange is formed integral with the main body of said disk.

5. A pop safety valve comprising a valve disk, a valve seat for seating said valve disk, a valve stem abutting against the rear portion of said valve disk, and a spring surrounding the upper portion of said valve stem for pressing said valve disk downward through said valve stem, said valve disk having an annular protrusion having an inclined end surface formed in the bottom surface of said disk a distance inward from the peripheral edge thereof, and an annular flange extending inwardly with taper from the bottom peripheral edge of said disk, the inner upper surface of said flange being in tight-fitting contact with the inclined end surface of said protrusion with an annular space formed therebetween, said flange being provided with an under surface which serves as a seating surface for contact with the valve seat, the entire area of said seating surface being adapted to contact the seat surface when said disk is in the closed position.

References Cited
UNITED STATES PATENTS

| | | | |
|---|---|---|---|
| 2,355,916 | 8/1944 | Klafstad | 137—477 XR |
| 2,643,671 | 6/1953 | Dayton | 137—469 |

HAROLD W. WEAKLEY, *Primary Examiner.*

U.S. Cl. X.R.

137—474; 251—334